(12) United States Patent
Bahirat

(10) Patent No.: US 12,461,654 B2
(45) Date of Patent: Nov. 4, 2025

(54) METHOD OF DETECTING READ HOTNESS AND DEGREE OF RANDOMNESS IN SOLID-STATE DRIVES (SSDS)

(71) Applicant: INTEL NDTM US LLC, Santa Clara, CA (US)

(72) Inventor: Shirish Bahirat, Longmont, CO (US)

(73) Assignee: INTEL NDTM US LLC, Santa Clara, CA (US)

( * ) Notice: Subject to any disclaimer, the term of this patent is extended or adjusted under 35 U.S.C. 154(b) by 808 days.

(21) Appl. No.: 17/004,727

(22) Filed: Aug. 27, 2020

(65) Prior Publication Data

US 2020/0393974 A1  Dec. 17, 2020

(51) Int. Cl.
*G06F 3/06* (2006.01)

(52) U.S. Cl.
CPC .......... *G06F 3/0616* (2013.01); *G06F 3/0631* (2013.01); *G06F 3/0632* (2013.01); *G06F 3/0647* (2013.01); *G06F 3/0653* (2013.01); *G06F 3/0679* (2013.01)

(58) Field of Classification Search
CPC .... G06F 3/0616; G06F 3/0631; G06F 3/0632; G06F 3/0647; G06F 3/0653; G06F 3/0679
See application file for complete search history.

(56) References Cited

U.S. PATENT DOCUMENTS

| | | | | |
|---|---|---|---|---|
| 8,239,612 B2 * | 8/2012 | Mukaida | ............ | G06F 12/0246 711/103 |
| 9,864,529 B1 * | 1/2018 | Chen | ............ | G06F 3/0643 |
| 10,733,110 B1 * | 8/2020 | Volpe | ............ | G06F 3/0656 |
| 2003/0177435 A1 * | 9/2003 | Budd | ............ | H03M 13/096 714/776 |
| 2011/0219203 A1 * | 9/2011 | Nurminen | ............ | G11C 11/406 711/E12.001 |
| 2011/0299317 A1 * | 12/2011 | Shaeffer | ............ | G11C 13/0002 257/E21.328 |
| 2012/0198152 A1 * | 8/2012 | Terry | ............ | G06F 11/1092 711/E12.001 |
| 2014/0013052 A1 * | 1/2014 | Sawin | ............ | G06F 12/0862 711/E12.024 |
| 2016/0217031 A1 * | 7/2016 | Arslan | ............ | G06F 3/0653 |
| 2016/0225461 A1 * | 8/2016 | Tuers | ............ | G11C 16/26 |
| 2019/0220397 A1 * | 7/2019 | Lee | ............ | G11C 11/5642 |
| 2020/0192844 A1 * | 6/2020 | Adams | ............ | G06F 3/0659 |
| 2021/0109675 A1 * | 4/2021 | Jung | ............ | G06F 3/0659 |

* cited by examiner

*Primary Examiner* — Eric T Loonan
(74) *Attorney, Agent, or Firm* — Morgan, Lewis & Bockius LLP

(57) ABSTRACT

A request to read data stored in a non-volatile memory (NVM) is processed by incrementing a global read counter for the NVM, incrementing a local read counter for a zone of the NVM being accessed by processing of the read request, computing a degree of read hotness for the zone, computing a read concentration of the zone based at least in part on the degree of read hotness of the zone, the global read counter, and the local read counter, and relocating the data in the NVM when the read concentration of the zone meets or exceeds a threshold.

20 Claims, 5 Drawing Sheets

METHOD OF DETECTING READ HOTNESS AND DEGREE OF RANDOMNESS IN SOLID-STATE DRIVES (SSDS)

TECHNICAL FIELD

The technical field relates generally to data storage in solid-state drives (SSDs) and, in particular, to detecting read hotness and degree of randomness of read requests in SSDs.

BACKGROUND

Non-volatile memory (NVM) refers to memory whose state is determinate even if power is interrupted to the device. Storage devices that include non-volatile memory include a secure digital card, a multimedia card, a flash drive (for example, a Universal Serial Bus (USB) flash drive also known as a "USB thumb drive" or "USB memory stick" that includes non-volatile memory with an integrated USB interface), and an SSD.

The non-volatile memory can comprise a block addressable memory device, such as NAND, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). The NAND flash cell uses the threshold voltage of a floating-gate transistor to represent the data stored in the cell. In a SLC NAND flash memory, each memory cell has two voltage levels corresponding to two states (0, 1) to represent one bit. In an MLC, TLC and QLC NAND flash memory, each memory cell stores more than one bit. Each cell in an MLC NAND Flash memory uses four voltage levels corresponding to four states (00, 01, 10, 11) to represent 2 bits of binary data. Each cell in a TLC NAND Flash memory uses eight voltage levels corresponding to eight states (000 to 111) to represent 3 bits of binary data. Each cell in a QLC NAND Flash memory uses sixteen voltage levels corresponding to sixteen states (0000 to 1111) to represent 4 bits of binary data.

With the emergence of higher capacity NAND-based NVM devices and lowering cost gaps compared with hard disk drives (HDD)s, cloud service providers (CSPs) are using more SSDs. Traditional band-based, logical block SSDs are being replaced by SSDs designed with new paradigms like "zoned namespaces", direct placement, open channel and key-value store. Logical bands span across all dies and all channels and are mapped to same erase block number, however new approaches including zones, chunks, and replacement units span across one or only a few erase blocks (EBs). Traditional block device read disturb algorithms do not work for these emerging SSDs because the relocation granularity is at the block level instead of the band level and in some cases, relocation needs to be executed by the host computing system instead of the SSD.

Other features of the described embodiments will be apparent from the accompanying drawings and from the detailed description that follows.

DESCRIPTION OF THE EMBODIMENTS

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

An MLC NAND Flash memory cell is programmed to one of four threshold voltages based on the logical value that the flash memory cell represents. The logical multi-bit value stored in the Flash cell is read by comparing a threshold voltage of the Flash memory cell with reference voltages.

Figure 1:
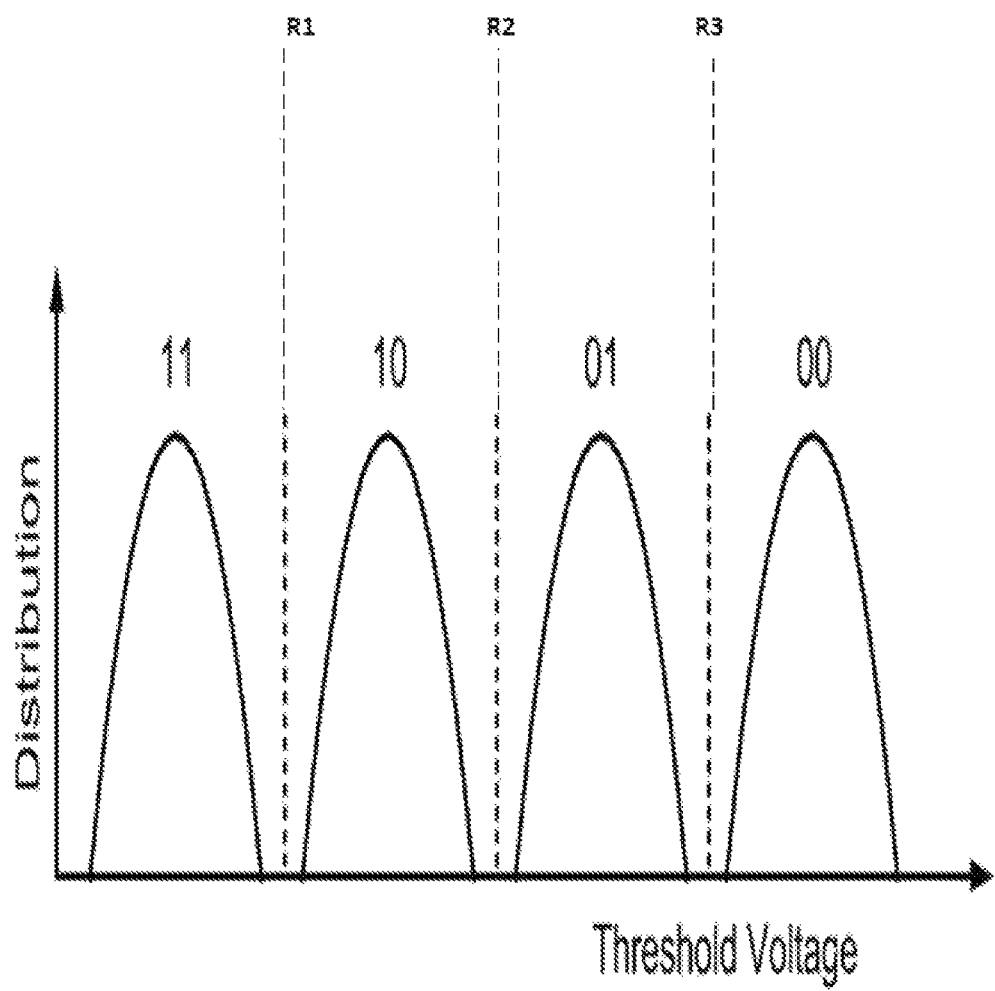
FIG. 1 is a graph illustrating the four voltage regions for two pages (upper page, lower page) in an MLC Flash memory cell according to some embodiments.

FIG. 1 is a graph illustrating the four voltage regions (for two pages (upper page, lower page) in an MLC Flash memory cell. Read reference voltages R1, R2, and R3 are located in the non-overlapping regions of the threshold voltage regions that are determined by an upper read reference voltage and a lower read reference voltage.

During a read operation to the MLC NAND Flash memory cell, a read reference voltage (that is, R1, R2, or R3) is applied to the transistor corresponding to the MLC NAND Flash memory cell. If the applied read reference voltage is higher than the threshold voltage, the transistor is turned on. The threshold voltage of the NAND Flash memory cell is compared with the applied read reference voltage to determine the logical two-bit value (00, 01, 10 or 11) represented by the threshold voltage.

In the NAND flash memory, transistors are connected in series with adjacent cells sharing a source and a drain. Vertical strings of series-connected transistors are attached to the bit lines (BLs). The control gates of the transistors connected across different strings constitute a word line (WL). A page is a set of bit lines linked with the same word line. For example, a page in a 2 Gigabit (GB) SLC NAND flash die is 2,112 bytes (2048 bytes of data and 64 bytes of metadata (including Error Correction Code (ECC) data for the data stored in the page). In one embodiment, the SLC NAND flash die can have 2,048 blocks, with each block having 64 pages. Data is read and written (programmed) page by page and erased block by block.

A MLC NAND Flash memory includes two pages (upper, lower) per word line, a TLC NAND Flash memory includes three pages (extra, upper, lower) per word line and a QLC NAND Flash memory includes four pages (top, extra, upper, lower) per word line. In future, a MLC NAND Flash memory may include five or more pages (PLC NAND flash memory).

Figure 2:
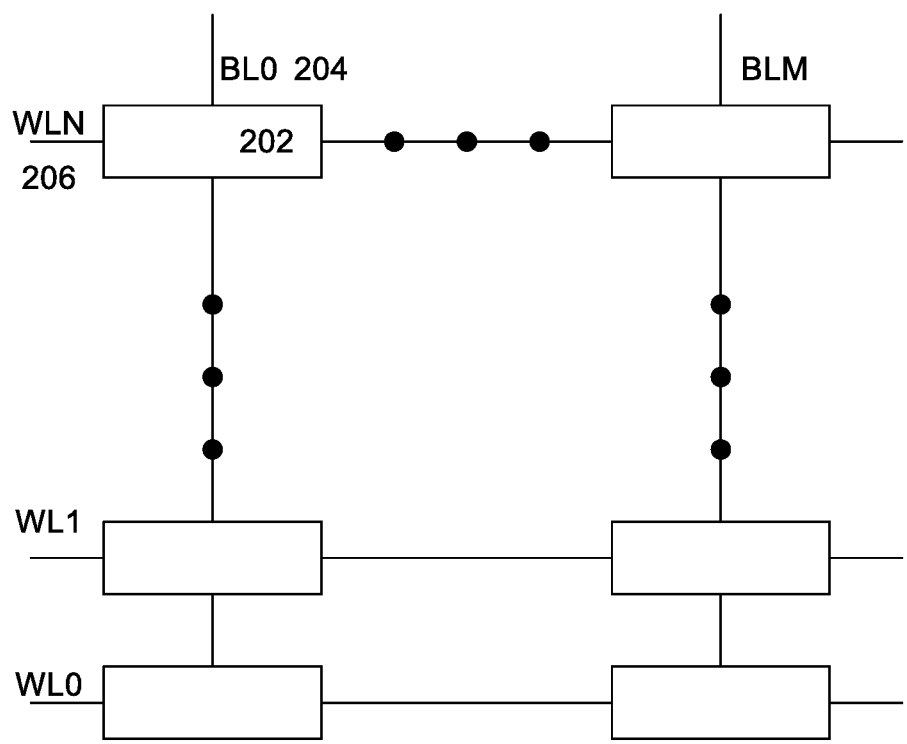
FIG. 2 is a block diagram of an NVM array in an NVM device according to some embodiments.

FIG. 2 is a block diagram of an NVM array 200 in an NVM device. NVM array 200 includes a plurality of NVM cells 202. Each NVM cell 202 in NVM array 200 can be selected via a bit line (BL) 204 (e.g., BL0 . . . BLM) and a word line (WL) 206 (e.g., WL0 . . . WLN). In an NVM array that includes QLC NAND, each NVM cell 202 can store four bits, one bit per page (upper, lower, extra, top). In an NVM array that includes TLC NAND, each NVM cell 200 can store three bits, one bit per page (upper, lower, top).

The number of word lines per word group can be selected based on the distance of the word lines from the source and drain. Word lines close to the source and drain may be referred to as edge word lines and are typically more prone to errors. In an embodiment of a three dimensional QLC NAND Flash, a group of word lines close to the source or drain can include less word lines than a group of word lines that are further from the source or drain.

During a read of a Flash memory cell 202, the threshold voltage of the Flash memory cell is compared to the read reference voltages to determine the stored logical value.

The threshold voltage of the Flash memory cell can change, for example, due to program/erase cycling of the Flash memory cell (also referred to as endurance), loss of charge in the Flash memory cell (also referred to as data retention) or interference when a neighboring Flash memory cell is programed (also referred to as read disturb). A change in the threshold voltage of the Flash memory cell can result in a read error, for example, an MLC Flash memory cell storing a logical two-bit value can be misread as storing a different logical two-bit value. Error correcting codes (ECC) are sometimes used to detect and correct bit errors that may occur in the MLC Flash memory.

As used herein, read hotness refers to frequency of access where "hot" data is accessed more frequently than "cold" data. Degree of randomness refers to a distribution of read accesses that exhibits a high degree of randomness.

Current methodologies to determining read disturbance can be classified into three major approaches: 1) device physics-based analysis to better understand read disturb phenomenon and propose device level solutions; 2) an algorithmic approach to count a number of reads based on band or block-based granularity and threshold-based methods to relocate the data; and 3) error correction schemes for read disturb mitigation.

Traditional approaches for read disturb mitigation in block-erasable memory devices included relocating data page by page from a victim band to a new destination band. However, emerging designs for SSDs that include block-erasable NVM devices, such as NAND, do not use full indirection unit-based logical to physical address mappings, thereby preventing usage of page-based relocations. Because of this, traditional block device read disturb mitigation strategies are not usable for zones, replacement units or chunks. If the number of reads is counted at block granularity then there is a risk of miscounting the correct read count for "hot" pages (e.g., those pages being frequently accessed). The read disturb threshold based on a block-based counter will not be able to differentiate between purely random reads and reads to just a few pages. To mitigate this risk, implementing a page-based read counter for a 32 terabyte (TB) SSD would require very large memory to maintain counts for each physical page in the SSD dynamic read-access memory (DRAM). The amount of DRAM needed would exceed 17 GBs, making such a scheme impractical.

If the reads per group of physical pages is counted to reduce memory requirements for the read disturb mitigation process, and a page-based read disturb threshold is applied (thereby relocating data more frequently) as a function of a number of reads in a specific zone, then such a scheme will have to trigger an entire zone relocation because there is no logical to physical address translation table within a specific zone. NAND blocks that contain many thousands of pages will need to be relocated causing significant (~45×) unnecessary read disturb induced write amplification.

As used herein, a zone is an area of memory as described in the NVMe Zoned Namespace specification technical proposal, to be embodied in the NVMe 2.0 specification. NVMe Zoned Namespaces (ZNS) divide the logical address space of a namespace into zones. Each zone provides a logical block addressing (LBA) range that must be written sequentially, and if written again, must be explicitly reset.

Ignoring the read disturb exposure is not a viable option. If the SSD waits until an error happens on a written block and uses that indication to relocate the data, then this adds the risk of losing customer data, which is unacceptable.

Existing algorithmic approaches lack a read hotness detection capability, the ability to determine degree of randomness in read commands, and a method to translate this information into an effective data relocation/read disturb mitigation strategy.

Embodiments of the present invention overcome these and other disadvantages of existing approaches and provide a read hotness and degree of randomness detector to solve the problem of excessive memory usage for storing counters by reducing the memory requirement from many gigabytes (GBs) to several megabytes (MBs) and reducing data relocations due to read disturbances to a minimum. Embodiments of the present invention include two techniques to track the read hotness granularity: 1) globally tracked hot reads (e.g., within an entire physical access range, e.g., an SSD); and 2) locally tracked hot reads (e.g., within a zone or erasure block (EB)).

Figure 3:
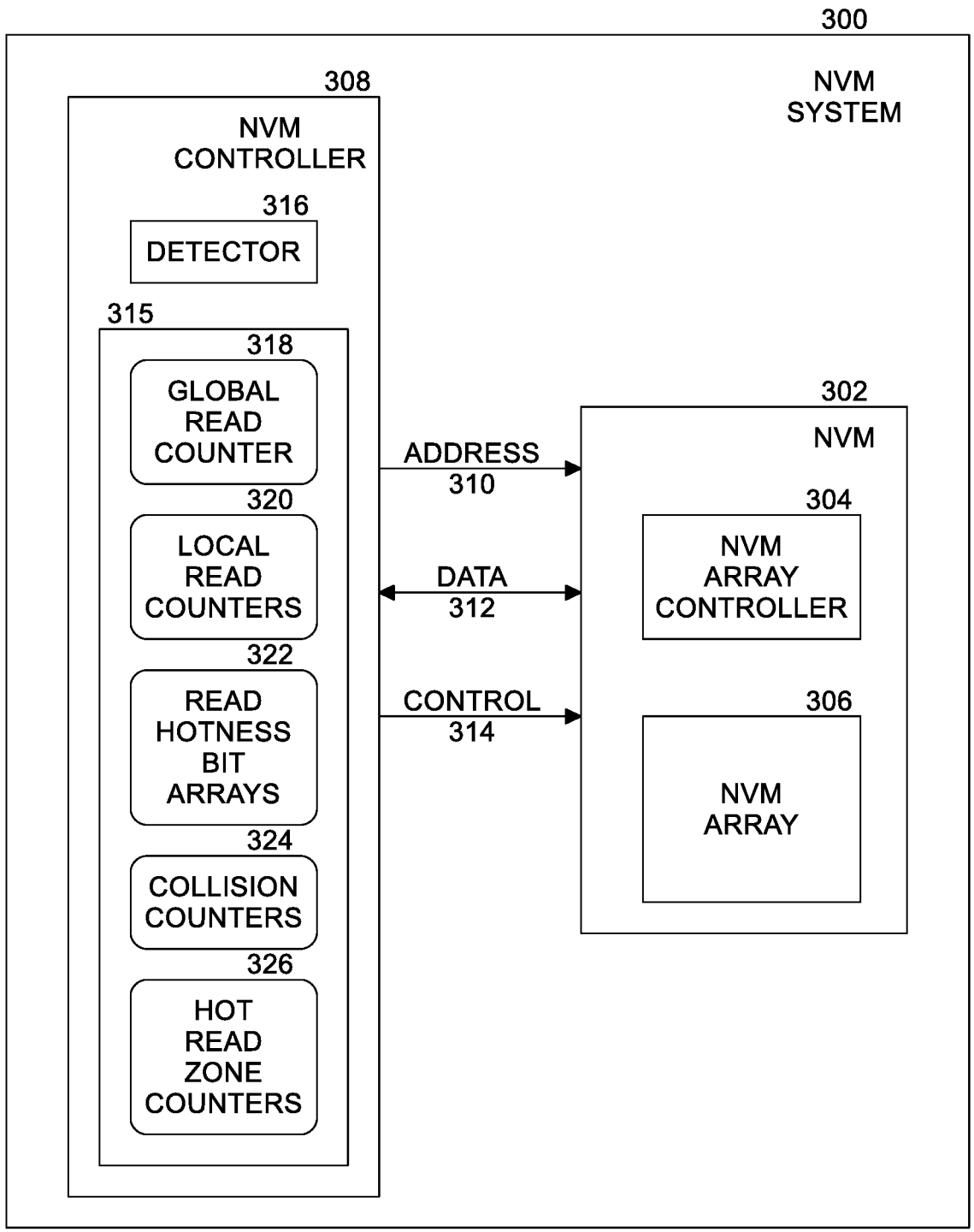
FIG. 3 is a block diagram of an NVM system that includes an NVM controller and an NVM device according to some embodiments.

FIG. 3 is a block diagram of NVM system 300 that includes an NVM controller 308 and an NVM device 302. In one embodiment NVM system 300 is an SSD and NVM device 302 is a NAND memory. NVM controller 308 and NVM device 302 are coupled via a control bus 314, data bus 312 and address bus 310. NVM device 302 includes an NVM array 306 and an NVM array controller 304. NVM controller 308 includes a memory 315. NVM controller memory 315 includes a plurality of data structures for use by detector 316.

Global read counter 318 stores the number of active read requests processed by NVM system 300 (e.g., for the SSD). When a read command is received by NVM system 300 from a host computer system, detector 316 increments global read counter 318. When a zone or erase block (EB) in NVM array 304 is reset or erased, detector 316 reduces global read counter 318 by the number of reads to that zone. In an embodiment, if a zone is mapped to single EB then the zone is equivalent to the EB; if a zone is mapped to more than one EB then all EBs mapped to the zone are accounted for together based on the mapping. In an embodiment, global read counter 318 is a 64-bit value.

Local read counters 320 store read counts for each of the zones in NVM array 306, respectively. In an embodiment, there is one local read counter for each zone. Detector 316 increments the local read counter for a zone when the host computer system issues a read command to read a physical page within that zone in NVM array 306. Detector 316 resets the local read counter for the zone to zero when the zone is reset. In an embodiment, each local read counter is a 32-bit value.

Read hotness bit arrays 322 store indicators of which word lines in NVM array 306 are getting read collisions over time (e.g., access frequency). In one embodiment, read hotness is tracked for all zones in NVM array 306. In another embodiment, only zones determined to be read "hot" zones over time are tracked. In an embodiment, the size of a read hotness bit array is the number of word lines in an EB or zone (with one or more bits representing each word line). In one embodiment, each read hotness bit array 322 comprises a Bloom filter based at least in part on a hash function that set bits in the read hotness bit array corresponding to pages read in the NVM array 306. Thus, a read hotness bit array is a set of possible results of hashing read addresses over time. When a zone is reset, the corresponding read hotness bit array is reset.

As used herein, a degree of read hotness for a zone is the number of bits set in the read hotness bit array for a word line. In an embodiment, a degree of read hotness is a 32-bit value for each zone. If over time only a few bits are set within a read hotness bit array then that means reads are being targeted to only a few pages in the zone (e.g., the reads are concentrated). If many bits are set across the read hotness bit array, then this means reads are random across the zone. This information is relative to the number of reads issued to the zone.

In one embodiment, if a zone belongs to a hot read zone based on a number of read collisions, then a normalized degree of hotness can be determined by computing (1/number of bits set in a read hotness bit array 322). For example, if the normalized degree of hotness is 1, then the zone is hot. If the normalized degree of hotness is 0.00002 (for example), then the zone is not hot. When a zone is reset, the corresponding degree of read hotness is reset. Other mechanisms for tracking hotness may also be used in other embodiments.

Collision counters 324 store read a collision count for each of the read hotness bit arrays 322. When a read is issued by the host computer system to a page in NVM array 306 that already has been flagged (e.g., a bit has been set according to the hash function described above) in a read hotness bit array 322, then detector 316 increments a corresponding collision counter 324 for that read hotness bit array (e.g., for that word line). If the degree of read hotness is high relative to the permissible reads to that zone then detector 316 may consider setting a local read counter threshold to a lower value and relocate the data to another location in NVM array 306. In an embodiment, a local read counter threshold is relative to how many reads are allowed for that EB or zone. Allowable reads are a function of the NAND physics and program erase cycle count and bit error rate or any combinations of these terms. In an embodiment, use of the Bloom filter for read hotness bit arrays 322 guarantees that there will be no false negatives, however there can be some false positives. When a zone is reset, the corresponding collision counter is reset. In an embodiment, a collision counter is a 16-bit value for each zone.

Hot read zone counters 326 store a count of read collisions once a collision counter 324 reaches a predetermined threshold. In one embodiment, the threshold is stored in another variable or variables; there can be different thresholds based on the number of counters described above./When the predetermined threshold is reached, a hot read zone counter 326 corresponding to a zone is incremented for each read to that zone thereafter (until reset). This provides an indication of hot read zones in NVM array 306. In some embodiments, hot read zone counters 326 may be used in combination with wear leveling (WL) and background data recovery (BDR) processes. Zones indicated hot by a hot read zone counter 326 may be candidates for relocation of data to another zone in the NVM array. When a zone is reset, a corresponding hot read zone counter 326 is decremented. In an embodiment, a hot read one counter is a 64-bit value.

Detector 316 monitors read requests sent to NVM 302, collects statistics relating to the read requests in global read counter 318, local read counters 320, read hotness bit arrays 322, collision counters 324, and hot read zone counters 326, and detects read hotness and degree of randomness of usage of pages in NVM array 306 for implementing read requests. Detector 316 determines if data being read by a host computer system should be relocated to another location in NVM array 306 to improve the reliability of NVM system 300. In one embodiment, detector 316 is implemented in hardware circuitry in NVM controller 308 or NVM system 300. In another embodiment, detector 316 is implemented in firmware executing on NVM controller 308. In another embodiment, detector 316 is implemented in software running on a host computer system.

Figure 4:
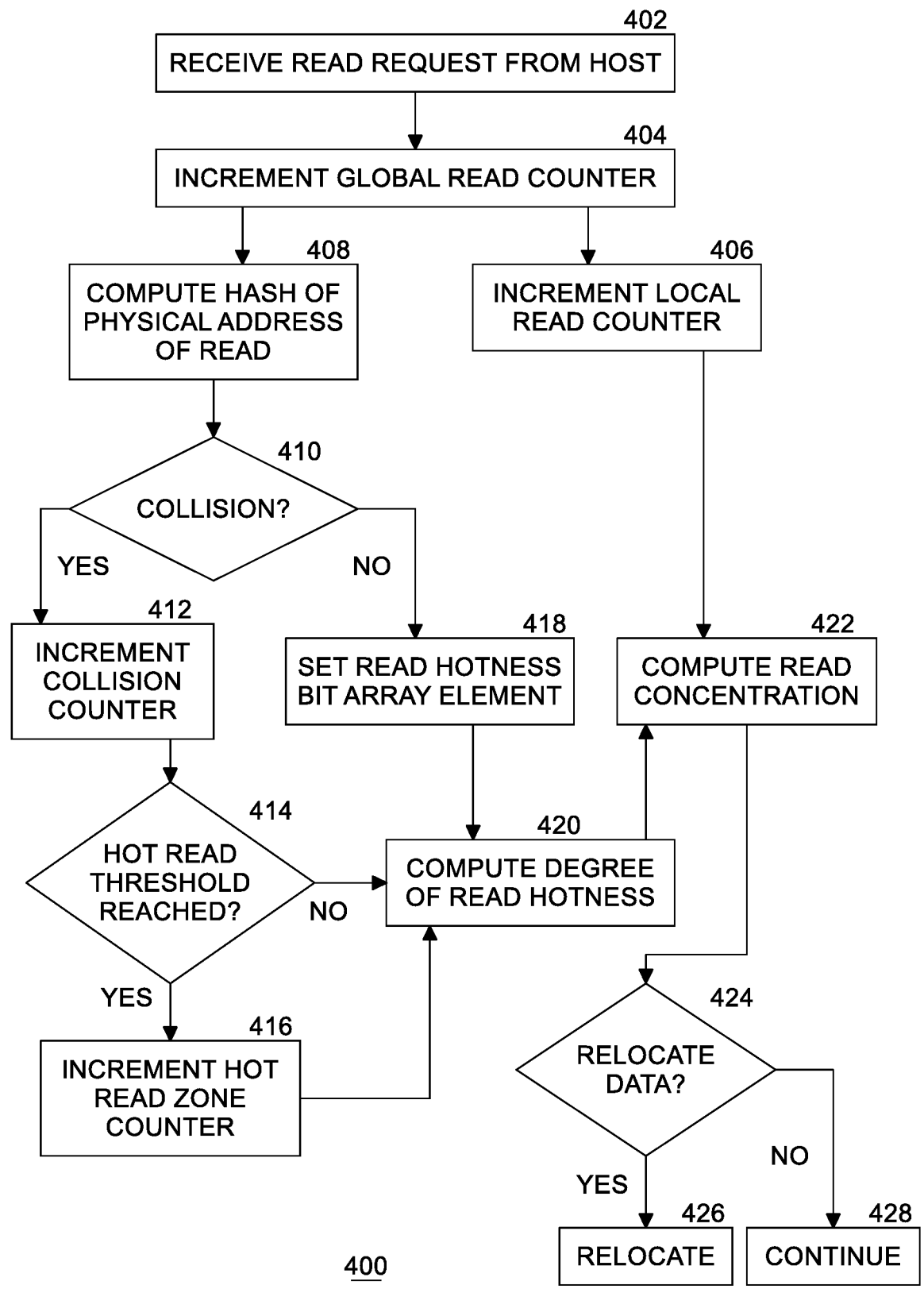
FIG. 4 is a flow diagram of determining a data relocation decision according to some embodiments.

FIG. 4 is a flow diagram 400 of determining a data relocation decision according to some embodiments. At block 402, NVM controller 308 receives a request to read data from NVM 302 from a host computer system. At block 404, detector 316 increments global read counter 318 (measuring the number of reads for the entire NVM system 300). Detector 316 increments the local read counter 320 at block 406 for the zone in NVM array 306 being read. At block 408, detector 316 computes a hash value of a physical address of the NVM being accessed by processing of the read request. The hash value indicates an element in the read hotness bit array 322 for the zone being read. If there is no collision at block 410 (meaning this is the first read from this physical address in a current time period since data was written), then detector 316 sets the read hotness bit array element at block 418. If there is a collision at block 410 (meaning there has already been at least one read from this physical address in the current time period since data was written), then detector 316 increments the collision counter 324 for the zone at block 412. If a hot read threshold is reached e.g., the threshold being a function of the NAND physics, etc.) at block 414 (due to the incrementing of the collision counter), at block 416 detector 316 increments the hot read zone counter 326 for the zone. At block 420, detector 316 computes a degree of read hotness for the zone. In an embodiment, the degree of read hotness for each zone is stored in one or more of NVM controller 308 and NVM 302.

At block 422, detector 316 computes a read concentration value based at least in part on the degree of read hotness for the zone, a number of reads to the zone (as indicated by the local read counter 320), global read counter 318, and a hot read zone counter 326. If the number of reads to a zone since the zone was last written is over a threshold, this means that the zone is a hot read zone. Within the hot read zone, if reads are concentrated to a small number of pages, this means that the zone has hot pages.

In one embodiment, the read concentration of a zone is computed as:

(number of reads to a zone/degree of read hotness)*
(number of reads to a zone/number of global reads)

At block 424, detector 316 determines whether to relocate the data that is subject to the read request based on the read concentration computed at block 422 and the hot zone read counter for the zone. In one embodiment, these statistics are normalized to relate to the media/NAND read capability and set to a percentage value (for example 85% or 90%). In an embodiment, when the read concentration meets or exceeds a predetermined threshold, then detector 316 relocates the data in the NVM. Threshold setting is function of number of functional parameters such as expected response time, relocation time, host incoming read rate, etc. If the detector determines that the data should be relocated, detector 316 notifies NVM controller 308 to relocate the data to another zone in NVM array 306 at block 426. Otherwise, NVM controller 308 processing continues at block 428.

Figure 5:
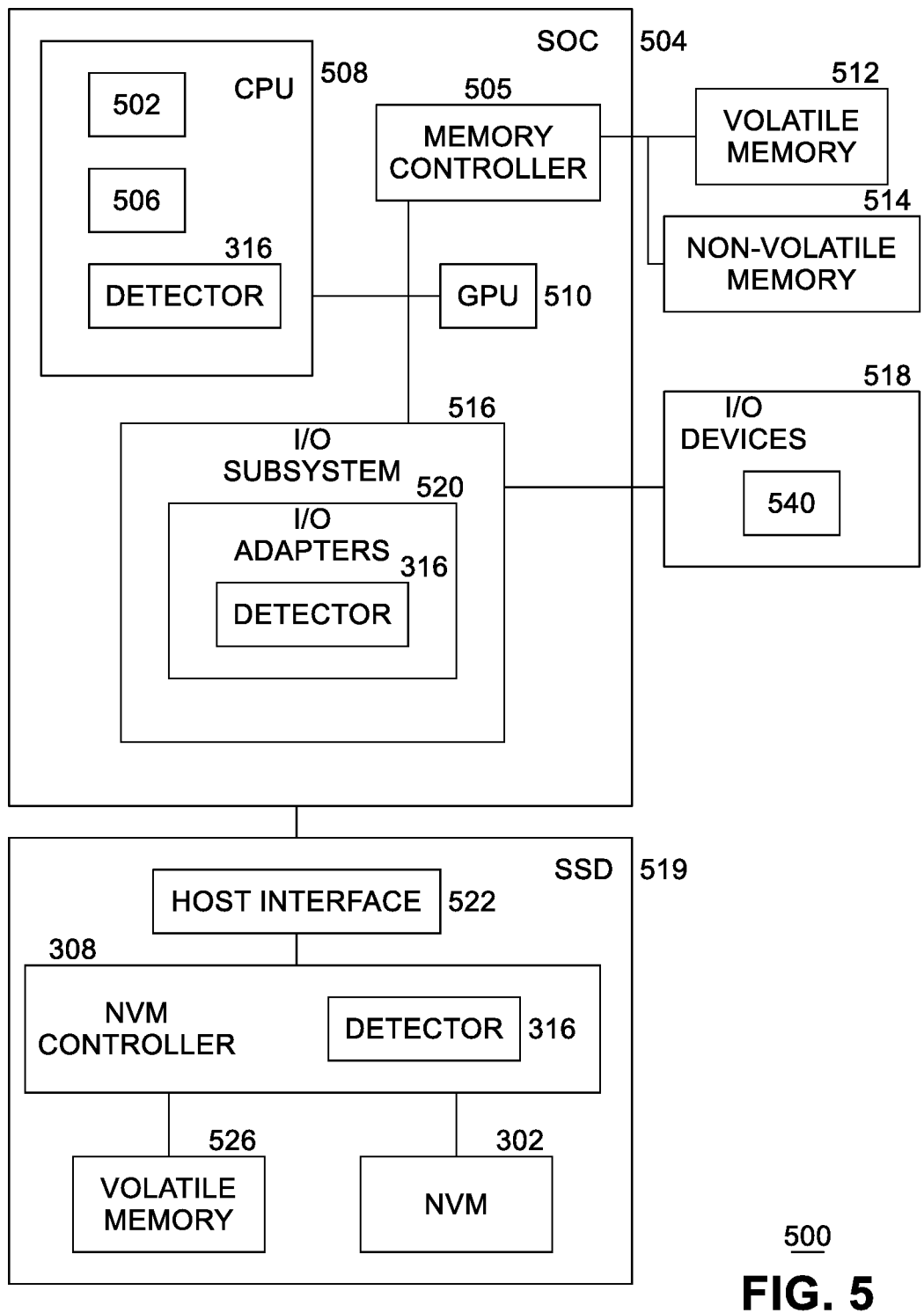
FIG. 5 is a block diagram of an embodiment of a computer system that includes a detector to detect read hotness according to some embodiments.

FIG. 5 is a block diagram of an embodiment of a host computer system 500 that includes detector 316 to detect read hotness according to some embodiments. Computer system 500 corresponds to any computing device including, but not limited to, a server, a workstation computer, a desktop computer, a laptop computer, and/or a tablet computer.

Computer system 500 includes a system on chip (SOC or SoC) 504 which combines processor, graphics, memory, and Input/Output (I/O) control logic into one SoC package. SoC 504 includes at least one Central Processing Unit (CPU) module 508, a memory controller 505, and a Graphics Processor Unit (GPU) 510. In other embodiments, memory controller 505 can be external to SoC 504. CPU module 508 includes at least one processor core 502, and a level 2 (L2) cache 506.

Although not shown, each of the processor core(s) 502 can internally include one or more instruction/data caches, execution units, prefetch buffers, instruction queues, branch address calculation units, instruction decoders, floating point units, retirement units, etc. CPU module 508 can correspond to a single core or a multi-core general purpose processor, such as those provided by Intel® Corporation, according to one embodiment.

GPU 510 can include one or more GPU cores and a GPU cache which can store graphics related data for the GPU core. The GPU core can internally include one or more execution units and one or more instruction and data caches. Additionally, GPU 510 can contain other graphics logic units that are not shown in FIG. 5, such as one or more vertex processing units, rasterization units, media processing units, and codecs.

Within I/O subsystem 516, one or more I/O adapter(s) 520 are present to translate a host communication protocol utilized within the processor core(s) 502 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

I/O adapter(s) 520 can communicate with external I/O devices 518 which can include, for example, user interface device(s) including a display and/or a touch-screen display 540, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

I/O adapter(s) 520 can also communicate with a solid-state drive ("SSD") 519 which includes NVM controller 308, a host interface 552, a volatile memory 526, and non-volatile memory 302 that includes one or more non-volatile memory devices.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place three dimensional cross-point memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

I/O adapters 520 can include a Peripheral Component Interconnect Express (PCIe) adapter that is communicatively coupled using the NVMe (NVM Express) over PCIe (Peripheral Component Interconnect Express) protocol over a bus to host interface 522 in the SSD 519. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at nvmexpress.org. The PCIe standards are available at pcisig.com.

Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random-Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at jedec.org.

Memory controller 505 interfaces with volatile memory 512 and non-volatile memory 514.

CPU 508 runs an operating system (not shown) that manages computer hardware and software including memory allocation and access to I/O devices. Examples of operating systems include Microsoft® Windows®, Linux®, iOS® and Android®.

In various embodiments, detector 316 may be implemented as software executed by CPU 508, software or firmware in I/O adapters 520 within I/O subsystem 516, or in firmware or hardware in NVM controller 308.

The described embodiments are illustrated by way of example and not limitation in the figures of the accompanying drawings. The methods, processes and logic depicted in the figures that follow can comprise hardware (e.g. circuitry, dedicated logic, controllers, etc.), software (such as is run on a general-purpose computer system or a dedicated machine, e.g. a software module or logic), and interfaces (such as a memory interface) between hardware and software, or a combination of both. Although the depicted methods, processes and logic may be described in terms of sequential operations, it should be appreciated that some of the described operations can be performed in a different order. Moreover, some operations can be performed in parallel rather than sequentially.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
receiving a request to read data stored in a non-volatile memory;
incrementing a global read counter for the non-volatile memory;
incrementing a local read counter for a zone of the non-volatile memory being accessed by processing of the request;
computing a degree of read hotness for the zone;
computing a read concentration of the zone, wherein the read concentration of the zone is computed as a number of reads to the zone from the local read counter for the zone divided by the degree of read hotness for the zone and then multiplied by the number of reads to the zone from the local read counter for the zone divided by a number of global reads from the global read counter; and
determining the read concentration of the zone meets or exceeds a threshold, and in response, relocating the data stored in the non-volatile memory, wherein the threshold is based on one or more functional parameters, and wherein the data is relocated subject to the request based on the read concentration of the zone meeting or exceeding the threshold such that the zone is classified as a hot read zone.

2. The method of claim 1, further comprising:
computing a hash value of a physical address of the non-volatile memory being accessed by processing of the request, the hash value indicating an element in a read hotness bit array for the zone;
if there has been at least one read from the non-volatile memory at the physical address since data was written to the non-volatile memory at the physical address, incrementing a collision counter, and if a hot read threshold is reached as a result of incrementing the collision counter, incrementing a hot read zone counter for the zone; and
if there has not been at least one read from the non-volatile memory at the physical address since data was written to the non-volatile memory at the physical address, setting the element in the read hotness bit array for the zone.

3. The method of claim 2, wherein the degree of read hotness for the zone comprises a number of bits set in the read hotness bit array for the zone, wherein the collision counter stores a collision count for the read hotness bit array.

4. The method of claim 3, further comprising resetting the collision counter, wherein the element in the read hotness bit array corresponds to a page read in the non-volatile memory.

5. The method of claim 1, further comprising:
resetting one or more zones of the non-volatile memory, wherein the local read counter for the zone is reset to zero, wherein when the one or more zones of the non-volatile memory are reset, the global read counter is reduced by a number of reads to a reset zone.

6. The method of claim 1, further comprising:
computing a hash value of a physical address of the non-volatile memory being accessed by processing of the request, the hash value indicating an element in a read hotness bit array for the zone.

7. The method of claim 6, further comprising:
in accordance with a determination there has not been at least one read from the non-volatile memory at the physical address since data was written to the non-volatile memory at the physical address, setting the element in the read hotness bit array for the zone.

8. The method of claim 6, further comprising:
in accordance with a determination that there has been at least one read from the non-volatile memory at the physical address since data was written to the non-volatile memory at the physical address, incrementing a collision counter.

9. The method of claim 8, further comprising:
determining whether a hot read threshold is reached as a result of incrementing the collision counter; and
in accordance with a determination that the hot read threshold is reached, incrementing a hot read zone counter for the zone.

10. The method of claim 8, wherein the degree of read hotness for the zone comprises a number of bits set in the read hotness bit array for the zone, wherein the collision counter stores a collision count for the read hotness bit array.

11. An apparatus comprising:
processor circuitry to:
receive a request to read data stored in a non-volatile memory;
increment a global read counter for the non-volatile memory;
increment a local read counter for a zone of the non-volatile memory being accessed by processing of the request;
compute a degree of read hotness for the zone;
compute a read concentration of the zone, wherein the read concentration of the zone is computed as a number of reads to the zone from the local read counter for the zone divided by the degree of read hotness for the zone and then multiplied by the number of reads to the zone from the local read counter for the zone divided by a number of global reads from the global read counter; and
determine the read concentration of the zone meets or exceeds a threshold, and in response, relocate the data stored in the non-volatile memory when a read concentration of the zone meets or exceeds a threshold, wherein the threshold is based on one or more functional parameters, and wherein the data is relocated subject to the request based on the read concentration of the zone meeting or exceeding the threshold such that the zone is classified as a hot read zone.

12. The apparatus of claim 11, wherein the processor circuitry to:
compute a hash value of a physical address of the non-volatile memory being accessed by processing of the request, the hash value indicating an element in a read hotness bit array for the zone;
if there has been at least one read from the non-volatile memory at the physical address since data was written to the non-volatile memory at the physical address, increment a collision counter, and if a hot read threshold is reached as a result of incrementing the collision counter, incrementing a hot read zone counter for the zone; and
if there has not been at least one read from the non-volatile memory at the physical address since data was written to the non-volatile memory at the physical address, set the element in the read hotness bit array for the zone.

13. The apparatus of claim 12, wherein the degree of read hotness for the zone is a number of bits set in the read hotness bit array for the zone, wherein the collision counter stores a collision count for the read hotness bit array.

14. The apparatus of claim 13, wherein the processor circuitry is further to reset the collision counter, wherein the element in the read hotness bit array corresponds to a page read in the non-volatile memory.

15. The apparatus of claim 11, wherein the processor circuitry is further configured to reset one or more zones of the non-volatile memory, wherein the local read counter for the zone is reset to zero, wherein when the one or more zones of the non-volatile memory are reset, the global read counter is reduced by a number of reads to a reset zone.

16. At least one non-transitory computer-readable storage medium having stored thereon instructions which, when executed, cause a computing device to perform operations comprising:
receiving a request to read data stored in a non-volatile memory;
incrementing a global read counter for the non-volatile memory;
incrementing a local read counter for a zone of the non-volatile memory being accessed by processing of the request;
computing a degree of read hotness for the zone;
computing a read concentration of the zone, wherein the read concentration of the zone is computed as a number of reads to the zone from the local read counter for the zone divided by the degree of read hotness for the zone and then multiplied by the number of reads to the zone from the local read counter for the zone divided by a number of global reads from the global read counter; and
determining the read concentration of the zone meets or exceeds a threshold, and in response, relocating the data stored in the non-volatile memory, wherein the threshold is based on one or more functional parameters, and wherein the data is relocated subject to the request based on the read concentration of the zone meeting or exceeding the threshold such that the zone is classified as a hot read zone.

17. The non-transitory computer-readable storage medium of claim 16, wherein the operations further comprise:

computing a hash value of a physical address of the non-volatile memory being accessed by processing of the request, the hash value indicating an element in a read hotness bit array for the zone;

if there has been at least one read from the non-volatile memory at the physical address since data was written to the non-volatile memory at the physical address, incrementing a collision counter, and if a hot read threshold is reached as a result of incrementing the collision counter, incrementing a hot read zone counter for the zone; and if there has not been at least one read from the non-volatile memory at the physical address since data was written to the non-volatile memory at the physical address, setting the element in the read hotness bit array for the zone.

18. The non-transitory computer-readable storage medium of claim 17, wherein the degree of read hotness for the zone comprises a number of bits set in the read hotness bit array for the zone, wherein the collision counter stores a collision count for the read hotness bit array.

19. The non-transitory computer-readable storage medium of claim 18, wherein the operations further comprise resetting the collision counter, wherein the element in the read hotness bit array corresponds to a page read in the non-volatile memory.

20. The non-transitory computer-readable storage medium of claim 16, further storing instructions for resetting one or more zones of the non-volatile memory, wherein the local read counter for the zone is reset to zero, wherein when the one or more zones of the non-volatile memory are reset, the global read counter is reduced by a number of reads to a reset zone.

* * * * *